US006850614B1

(12) United States Patent
Collins (10) Patent No.: US 6,850,614 B1
(45) Date of Patent: Feb. 1, 2005

(54) METHOD FOR PROVIDING CONSOLIDATED SPECIFICATION AND HANDLING OF MULTIMEDIA CALL PROMPTS

(75) Inventor: Kevin T. Collins, Roseville, CA (US)

(73) Assignee: Aspect Communication Corporation, San Jose, CA (US)

( * ) Notice: Subject to any disclaimer, the term of this patent is extended or adjusted under 35 U.S.C. 154(b) by 0 days.

(21) Appl. No.: 09/354,837

(22) Filed: Jul. 16, 1999

(51) Int. Cl.$^7$ ............................................... H04M 3/00
(52) U.S. Cl. .............................. 379/265.09; 379/88.13; 379/265.02
(58) Field of Search ....................... 709/202; 379/88.13, 379/90.01, 265.02, 265.09, 900, 88.17, 88.18, 88.22, 88.14

(56) References Cited

U.S. PATENT DOCUMENTS

| | | | | |
|---|---|---|---|---|
| 5,621,789 A | * | 4/1997 | McCalmont et al. | 379/265.06 |
| 5,724,092 A | * | 3/1998 | Davidsohn et al. | 348/14.01 |
| 5,884,032 A | * | 3/1999 | Bateman et al. | 709/204 |
| 6,049,602 A | * | 4/2000 | Foladare et al. | 379/265.04 |
| 6,075,843 A | * | 6/2000 | Cave | 379/88.13 |
| 6,094,673 A | * | 7/2000 | Dilip et al. | 709/202 |
| 6,130,933 A | * | 10/2000 | Miloslavsky | 379/90.01 |
| 6,151,317 A | * | 11/2000 | Strand | 370/385 |
| 6,226,516 B1 | * | 5/2001 | Gupta et al. | 455/433 |
| 6,370,508 B2 | * | 4/2002 | Beck et al. | 705/1 |
| 6,651,053 B1 | * | 11/2003 | Rothschild | 707/3 |

* cited by examiner

Primary Examiner—Bing Q. Bui
(74) Attorney, Agent, or Firm—Schwegman, Lundberg, Woessner & Kluth, P.A.

(57) ABSTRACT

Methods and apparatus for generating media-specific scripts for a plurality of multimedia communications systems are described. A method includes the step of receiving a transaction routing script. A media-specific script is generated for a plurality of communications media in accordance with the transaction routing script. An apparatus includes a transaction processor for receiving and routing communications from a plurality of communications mediums. A script generator generates a plurality of scripts specific to selected communications mediums in accordance with a media-independent portion of a pre-determined transaction routing script. In one embodiment, the pre-determined transaction routing script includes at least one prompt, at least one selectable option and a routing destination for each selectable option. In various embodiments, a media-specific script may correspond to electronic mail, touch tone telephone, or interactive voice response telephone communications medium. In one embodiment, a media-specific script defines at least one web page. In another embodiment, a media-specific script defines a plurality of hyperlinked web pages.

20 Claims, 5 Drawing Sheets

METHOD FOR PROVIDING CONSOLIDATED SPECIFICATION AND HANDLING OF MULTIMEDIA CALL PROMPTS

FIELD OF THE INVENTION

This invention relates to the field of multimedia call prompts. In particular, this invention is drawn to methods and apparatus for multimedia call prompts for multiple communication mediums.

BACKGROUND OF THE INVENTION

Transaction processing environments such as call centers enable routing of customer transactions (e.g., telephone calls) to agents for handling the customer's request. An automatic call distributor (ACD) is typically used to queue the calls and subsequently route them to agents subject to implementation specific rules when availability permits. For example, an ACD may route telephone calls to agents based on information about the originating telephone number in accordance with a set of rules.

The ACD may incorporate other components such as touch tone menu or interactive voice response (IVR) systems to enable callers to direct themselves to the appropriate agent by proceeding through a series of selection menus in response to voice or touch tone commands. The prompts, selections, and routing rules for telephone callers are typically defined through a script or call control table in the ACD.

Numerous other mediums are available for communication including electronic mail, facsimile transmissions, cellular telephones, and internet and intranet web browsing. ACDs and other communications systems may similarly incorporate media-specific components for handling routing of communications for one or more of these other types of communication mediums. Each type of media is often handled by its own system. Accordingly, each type of communication medium typically has a unique method for configuring and delivering the prompt and collecting the caller's response. Thus a communication system capable of handling multimedia communications may have a variety of media-specific applications for configuring the prompts, selections, and routing rules.

One disadvantage of having distinct applications for configuring and delivering the prompts is with respect to modification and maintenance of the prompts and routing rules consistently across multiple communication mediums. Modifications may not be promulgated to provide a consistent user interface across all mediums at the same time. Manually maintaining each media-specific component with a separate application typically also increases the exposure to implementation errors. Thus the use of distinct media-specific applications to independently handle the routing and menu system for each communication medium may result in errors or inconsistencies in implementation across the different mediums.

SUMMARY OF THE INVENTION

In view of limitations of known systems and methods, methods and apparatus for generating media-specific scripts for a plurality of multimedia communications systems.

A method includes the step of receiving a transaction routing script. A media-specific script is generated for a plurality of communications media in accordance with the transaction routing script. In one embodiment, the transaction routing script includes at least one prompt, at least one selectable option and a routing destination for each selectable option. In various embodiments a media-specific script may correspond to an electronic mail communications medium, a touch tone telephone communications medium, or an interactive voice response telephone system communications medium. In one embodiment, a media-specific script defines at least one web page. In another embodiment, a media-specific script defines a plurality of hyperlinked web pages.

An apparatus includes a transaction processor for receiving and routing communications from a plurality of communications mediums. A script generator generates a plurality of transaction routing scripts specific to selected communications mediums in accordance with a media-independent portion of a pre-determined transaction routing script. In one embodiment, the pre-determined transaction routing script includes at least one prompt, at least one selectable option and a routing destination for each selectable option. In various embodiments, a media-specific script may correspond to electronic mail, touch tone telephone, or interactive voice response telephone communications medium. In one embodiment, a media-specific script defines at least one web page. In another embodiment, a media-specific script defines a plurality of hyperlinked web pages. In one embodiment, the transaction processor is an automatic call distributor.

Other features and advantages of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

Particular embodiments are described below as used in a transaction processing environment such as an automatic call distributor for handling communication transactions from a variety of communication mediums. However, the teachings may be used in other communication environments.

Exemplary transactions in a transaction processing environment include telephone calls, facsimile transmissions, electronic mail (e-mail), video sessions, or network sessions (such as an Internet session). A particular transaction can be either inbound (e.g., received by a transaction processing system) or outbound (e.g., transmitted from a transaction processing system).

A transaction processing system is any device capable of receiving, transmitting, queuing, routing, or otherwise processing a transaction. A transaction processing system may also handle mixed-medium transactions (e.g., receive a telephone call and respond to the telephone call using e-mail or facsimile). Example transaction processing systems include automatic call distributors (ACDs), call centers, and other telephone call processing devices as well as e-mail routing systems and web servers.

Figure 1:
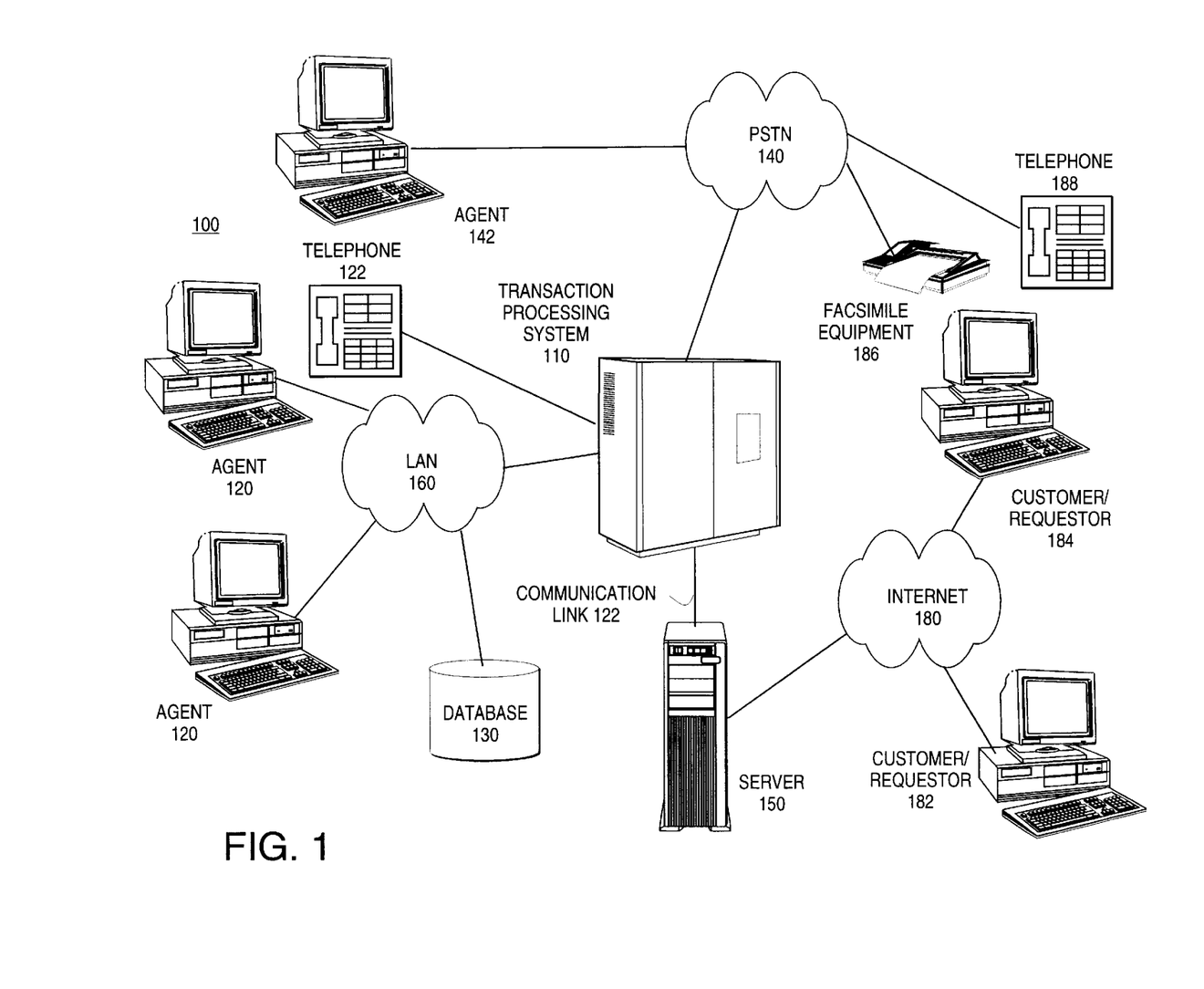
FIG. 1 illustrates one embodiment of a transaction processing system.

FIG. 1 illustrates one embodiment of a transaction processing environment 100. The transaction processing environment of FIG. 1 allows transaction initiators (e.g., callers) to contact a handler (e.g., a customer service agent) using various communication mediums. Similarly, the transaction processing environment allows an agent to respond to a received transaction or to initiate a new transaction.

Transaction processing system 110 is coupled to a server 150, a public switched telephone network (PSTN) 140 and a local area network (LAN) 160. Transaction processing system 110 is capable of processing various types of transactions, such as telephone calls, electronic mail (e-mail), voice mail, and facsimiles. Transaction processing system 110 is capable of receiving transactions from PSTN 140, LAN 160, and server 150. Similarly, transaction processing system 110 is capable of transmitting transactions to PSTN 140, LAN 160, and server 150. For example, transaction processing system 110 can receive an incoming telephone call directly via PSTN 140. Another incoming telephone call may be received by server 150 (e.g., an Internet telephone call received across Internet 180) and provided to transaction processing system 110 across a communication link 112 or across LAN 160. In other situations, transaction processing system 110 may receive an incoming e-mail from server 150 or LAN 160.

FIG. 1 illustrates a single server 150 capable of interacting with various components in the transaction processing environment 100. For example, server 150 may operate as a web server, an e-mail server, a fax server, and a video server. Additionally, server 150 can perform the functions of a control server, as discussed below. In alternate embodiments of the invention, the transaction processing environment may include multiple servers, in which each server is responsible for one or more types of transactions. For example, a web server processes all web-based transactions, an e-mail/fax server processes all e-mail and facsimile transactions, and a control server controls and manages various transactions and communication sessions in the transaction processing environment.

LAN 160 can be any type of network, including an intranet network, capable of communicating information between various nodes in the network. As shown in FIG. 1, multiple agents 120 are coupled to LAN 160. In one embodiment, hundreds or thousands of agents may be coupled to one or more LANs 160, which are coupled to transaction processing system 110. Alternatively, some or all of the agents 120 may be coupled directly to transaction processing system 110, rather than coupled through LAN 160.

Although agents 120 are represented in FIG. 1 by a computer, a particular agent 120 may utilize any type of device or system that allows interaction between the agent and another person or device (such as a customer or a customer's computer). For example, an agent handling only telephone call transactions might only use a telephone system, without requiring a computer.

Similarly, an agent handling only e-mail messages may require a computer system, but not a telephone. In a particular embodiment of the invention, each agent has a computer system and a telephone (which may be integrated into the computer system), such that the agent is capable of handling and responding to multiple types of transactions (e.g., telephone calls, e-mail, voice mail, and facsimiles).

Agent 142 is coupled to PSTN 140. Agents 120, discussed above, are located locally to transaction processing system 110 or include an access mechanism allowing agents 120 to establish a connection to LAN 160. Agent 142 is a remote agent or otherwise unable to directly connect to LAN 160. For example, agent 142 may be working at a location geographically distant from transaction processing system 110, such as working at home or traveling. Agent 142 establishes a connection with transaction processing system 110 across PSTN 140. Alternatively, agent 142 may connect with LAN 160 or transaction processing system 110 through Internet 180 or any other network or communication system.

A database 130 is coupled to LAN 160 and is used by transaction processing system 110, agents 120 and 142, and server 150 to store and retrieve various types of information. For example, database 130 may contain information about the transaction processing system, the performance of the system, and the agents and customers that use transaction processing system 110. In one embodiment, all agent computers, servers, and other devices coupled to LAN 160 are capable of storing and retrieving information from database 130.

As shown in FIG. 1, Internet 180 is coupled to server 150 and customer computers 182 and 184. Customer computer 182 may include an Internet phone for establishing voice communications between the customer and an agent across Internet 180. The customer using computer 184 has a telephone 188 and a fax machine 186 coupled to PSTN 140 and located near computer 184. Thus, the user of computer 184 may communicate with an agent of the transaction processing system using Internet 180 (e.g., using an Internet phone or e-mail application), fax machine 186, telephone 188, or any combination thereof.

For example, customer 184 may generate and transmit an e-mail message across Internet 180 to server 150. Server 150 then communicates the e-mail to transaction processing system 110, which provides the e-mail to a particular agent or group of agents for response.

Agents may be grouped together based on area of expertise, company department, or type of support provided (e.g., sales or technical support). The agent responding to the e-mail can respond with another e-mail message or may respond by telephone, facsimile, or any other type of transaction supported by the transaction processing system and the transaction initiator. In particular embodiments of the invention, the transaction initiator may specify the type of transaction used by the responding agent.

For example, a transaction initiator may generate an e-mail transaction, but request that an agent respond with a telephone call. Although customer computers 182 and 184 are shown coupled directly to Internet 180, it will be appreciated that any communication mechanism can be used to couple computers 182 and 184 to Internet 180, such as PSTN 140 and an Internet Service Provider (ISP). In alternate embodiments, Internet 180 may be replaced with any communication network using any communication protocol.

The environment illustrated in FIG. 1 includes a separate LAN 160 and Internet 180. In alternate environments, LAN 160 and Internet 180 are merged into a single communication network capable of communicating information between any two or more devices coupled to the communication network.

Each transaction server described with respect to FIG. 1 typically requires some type of control script or routing script to control the routing of calls to a handler or agent. Generally these routing scripts are independently generated and maintained. One disadvantage of de-centralized generation and maintenance is the risk of implementation inconsistencies across the "zone of customer contact." Another disadvantage is the need to "reconstruct" the customer interface over and over in order to generate a media-specific control script for each medium of communication. For example, scripts must be created for a web server, a fax server, an email server, an interactive voice response server, etc.

In order to have consistency across communication medium, each communication medium should have a media-specific script incorporating the media-independent aspects of a generalized script.

Figure 2:
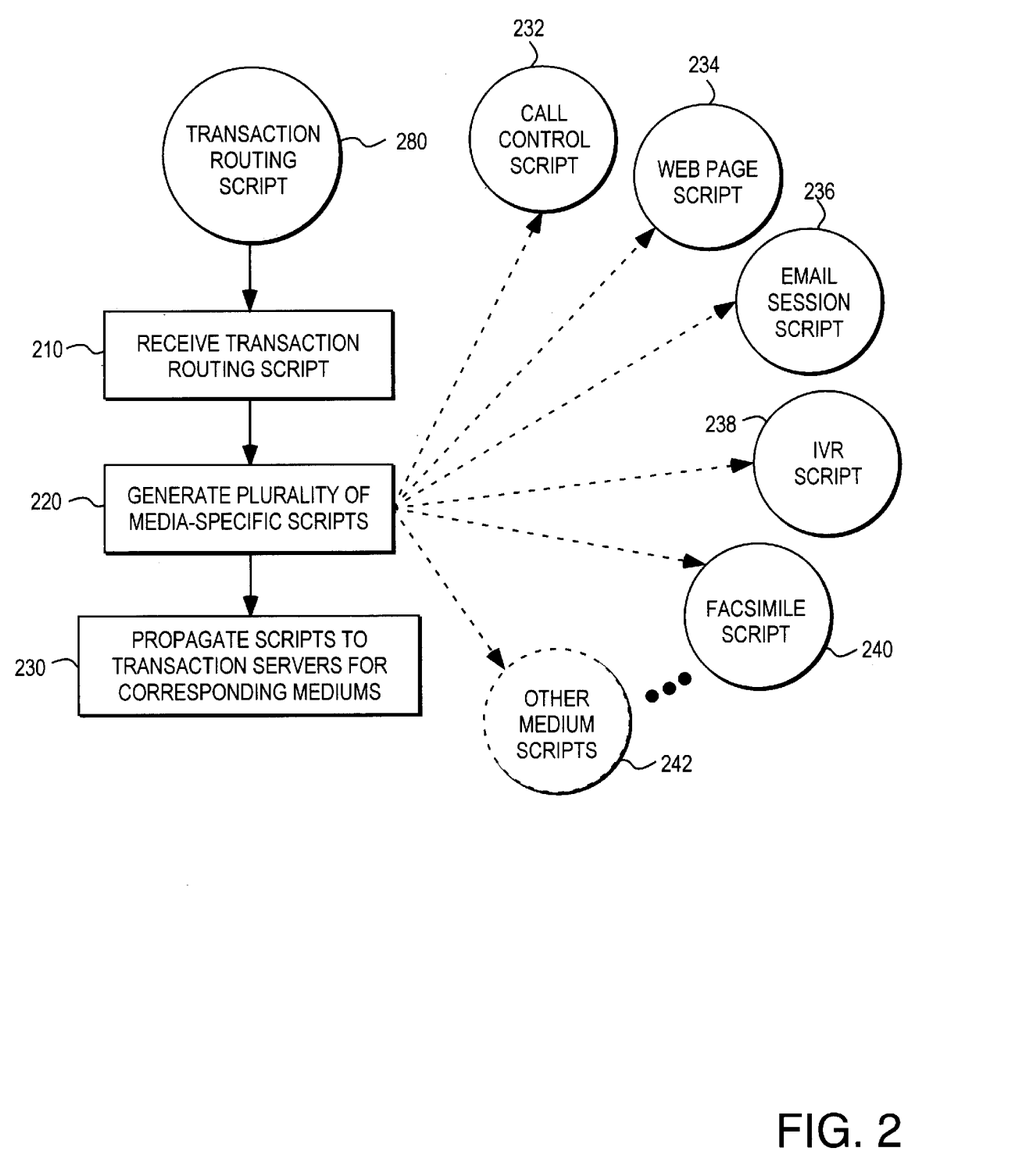
FIG. 2 illustrates one embodiment of a method of generating a plurality of media-specific scripts from a media-independent call control script.

In contrast, FIG. 2 illustrates a method of generating a media-specific script for a plurality of communications mediums from a single transaction routing control script 280. Transaction routing control script 280 may include information for configuring the interface particular to a specific communications medium. In one embodiment, the transaction routing script is a call control script.

The transaction routing script 280 is received in step 210. In step 220, a plurality of media-specific scripts is generated from transaction routing script 280. In various embodiments, a call control script 232, a web page script 234, an email session script 236, an interactive voice response (IVR) script 238, a facsimile script 240, or scripts specific to other mediums 242 are generated. Transaction routing script 280 may be referred to as the media-independent script or source script from which the media-specific scripts are generated. In various embodiments, the media-specific scripts may define routing for communications mediums including telephone, email, intranet, or internet communications.

Generally, there may still be a plurality of media-specific generators for generating the media-specific control scripts, but they can share a common transaction routing script (e.g., 280) or description as the input for creating the media-specific scripts. In step 230, the media-specific scripts are propagated to the transaction server handling the corresponding communication medium.

Figure 3:
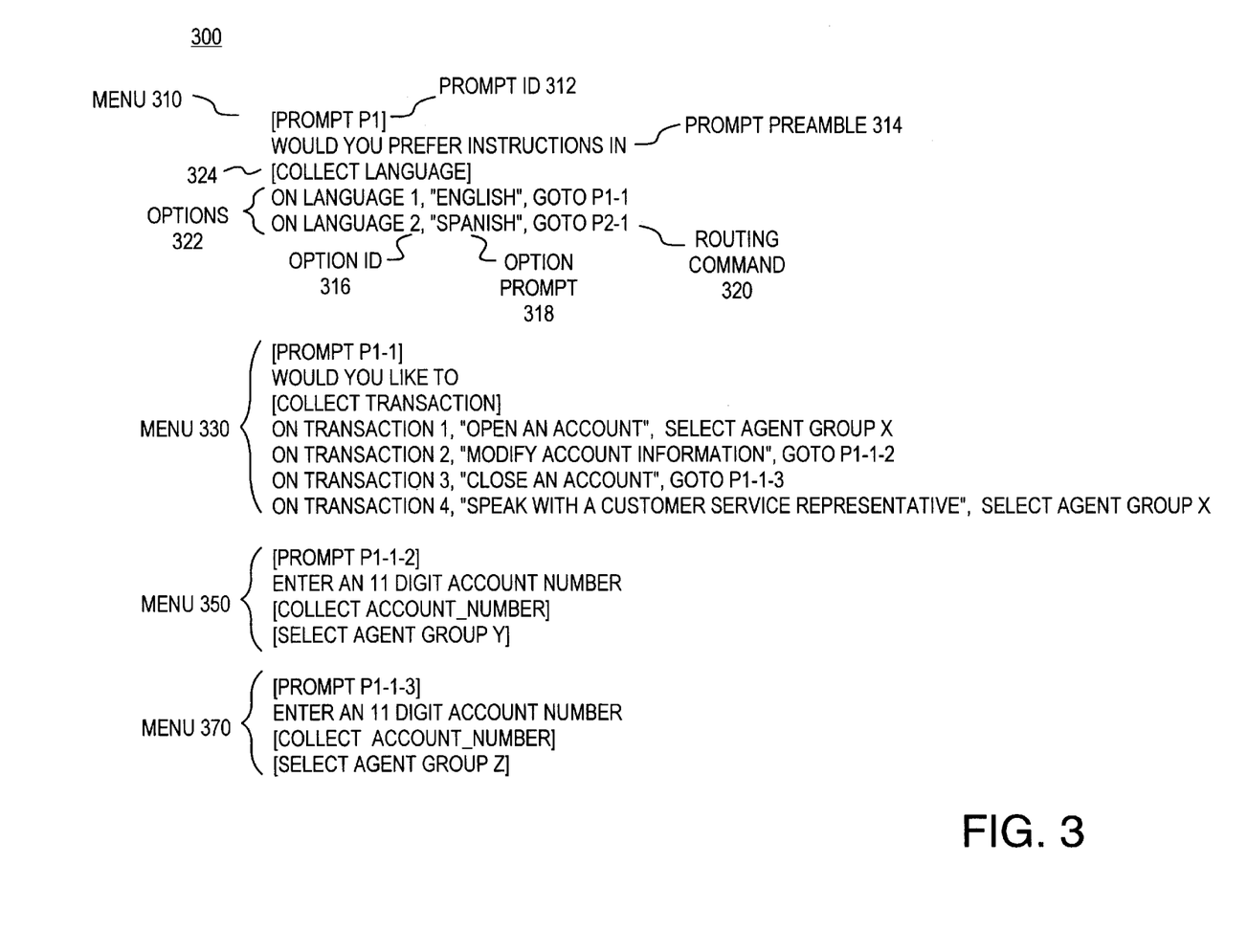
FIG. 3 illustrates one embodiment of a media-independent call control script including prompts, selectable options, and routing destinations corresponding to the selectable options.

FIG. 3 illustrates one embodiment of a media-independent script that is used to construct applicable media-specific scripts for the various communication mediums that the ACD interfaces with. In one embodiment, the media-independent script is a file containing tags or tokens that guide media-specific script generators in building media-specific scripts for a plurality of communication mediums.

Media-independent script 300 consists of a plurality of menus, each of which is associated with a prompt and one or more selectable options. Depending upon the media the prompt must be conveyed on, the prompt may be constructed a number of different ways. The media-specific script generators may analyze a given menu to construct the prompt in a manner best suited for a particular media.

In this example the script defines the prompts and the selections as well as the routing commands corresponding to the selections. In the illustrated embodiment, the script defines three levels of menus. One menu selection may result in routing the caller to another menu such that a caller may proceed through multiple levels of the menu before being directed to the appropriate agent.

Menu 310 includes a prompt identifier 112 to distinguish the menu and therefore its associated prompt from other menus and prompts in the script. Menu 310 contains a prompt preamble 314 that is used to construct a portion of the prompt presented to the user. In one embodiment, the prompt preamble is configured separately from the transaction routing script. The prompt preamble 314 is illustrated as is in FIG. 3 for simplicity.

In one embodiment, the prompt preamble is assigned a voice file and a text string. The voice file is used for audio communications such as touch tone or IVR. For text-based communications media such as web access, the text string or variations of it may be used. In one embodiment, a plurality of media specific prompts, each corresponding to a different type of communications medium, may be assigned to the prompt preamble.

Menu 310 also includes a plurality of selectable options 322. Each option has an option identifier (e.g., 316) to distinguish it from other options for this menu. The option identifier corresponds to one of the choices a user or caller is presented with. Each option identifier is associated with an option prompt 318 that may be used in creating the media-specific prompt.

Each option includes a command 320 that is performed whenever that option is selected. In one embodiment, the command may route the call to a particular agent or groups of agents or to another menu of the menu system. For example, if the value assigned in the collection step 324 to the variable "LANGUAGE" is "1", then the "GOTO P1-1" command is executed. The call routing script indicates that the script should continue with prompt P1-1 (menu 330), if "LANGUAGE" is "1" (i.e., if "ENGLISH" is selected).

Menu 310 defines a prompt for the language that subsequent prompts should be presented in. Menu 330 defines a prompt for types of banking transactions to be performed. Menus 350 and 370 are used to prompt the caller or user for an account number when certain types of transactions are selected before proceeding. The ACD may pass this information to the yet-to-be-determined destination or use this information to look the customer up in order to provide the subsequently assigned agent information about the customer.

Based on the prompt definition, different media-specific script generators may present the prompt in ways suited for a particular medium. The prompt, for example, may be presented in one manner for visual applications and another manner for audio applications.

For example, one application used to access resources available on the Internet and intranets is referred to as a browser. Browsers enable users to navigate and access hypertext documents and other resources residing on the same host or other networked hosts. Internet resources are identified by a uniform resource locator (URL) that identifies the host computer and the location of the desired resource on the host computer. These resources may include audio files, video clips, executable files, or virtually any other type of data.

Hypertext resources are resources that contain links to different locations within the same resource or other resources. These links can be visualized as webs linking files to other files on the same or different hosts. In one embodiment, these hypertext resources are stored as Hypertext Markup Language (HTML) files. HTML defines the links to other resources. When accessed from the internet or an intranet using a browser, an HTML file is often referred to as a page of the "web" or simply a web page. A web page, for example, may provide the user with visual, audio, or other multimedia data.

Figure 4:
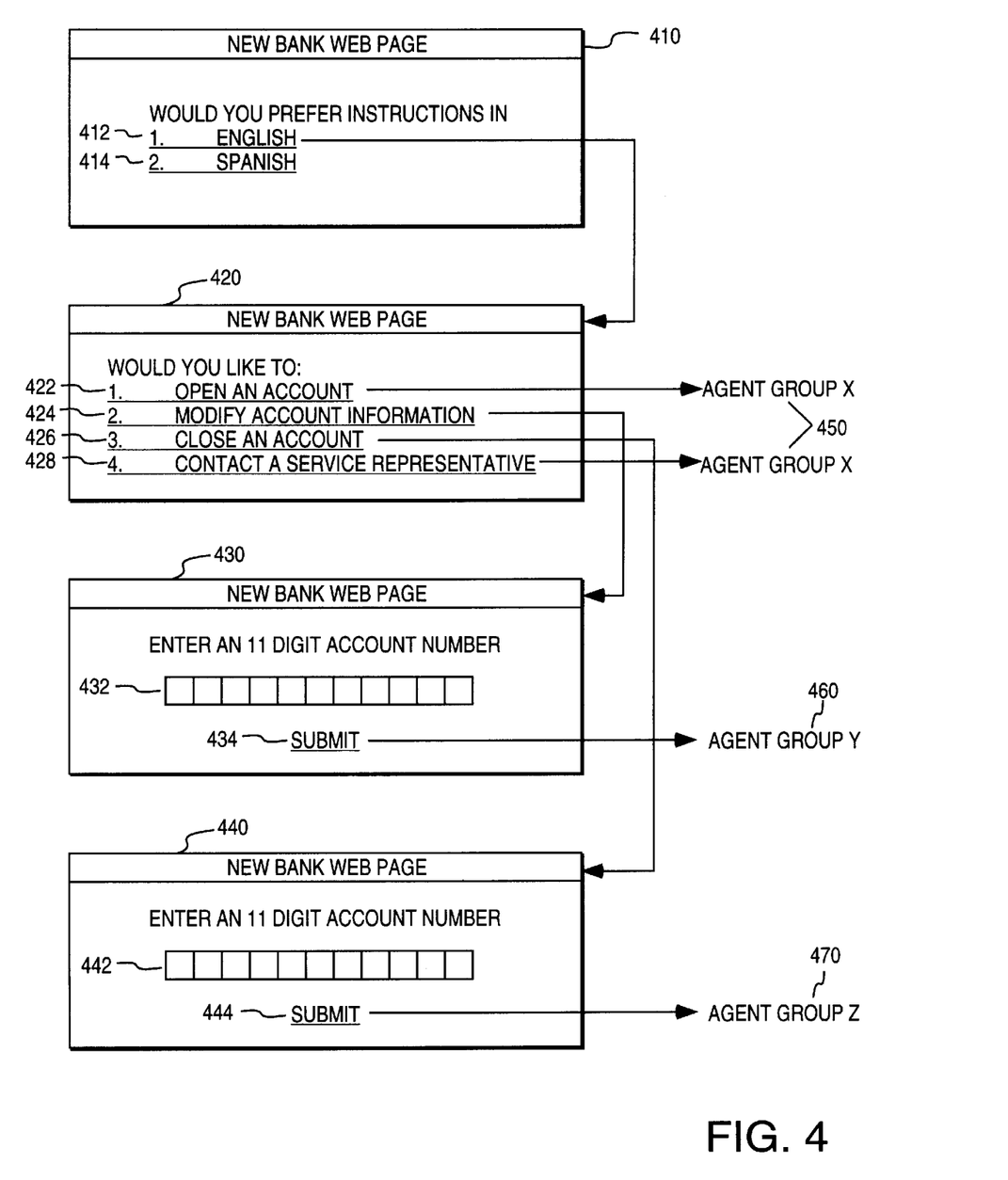
FIG. 4 illustrates the application of the method of FIG. 2 to the call control script of FIG. 3 for an internet or intranet application.

In one embodiment, an internet or intranet script generator (e.g., a web page editor) may generate one or more HTML file suitable for viewing with a browser. FIG. 4, for example, illustrates the web pages and hyperlinks as they might be constructed from the media-independent script of FIG. 3.

The internet or intranet script generator creates one or more HTML files that result in the web pages linked as illustrated in FIG. 4. In one embodiment, HTML code is generated to create a web page (410, 420, 430, 440) for each menu (310, 330, 350, 370).

The prompt of web page 410 has been constructed from the preamble 314 and the options 322 of menu 310. The underlined words represent a user-selectable hyperlink to another location. The arrows indicate the manner in which the web pages are linked. For example, the underlining of "ENGLISH" in menu 410 indicates that "ENGLISH" may be selected such as by a pointing device (e.g., mouse) or the keyboard. The arrows indicate that the user will be routed to web page 420 if option 412 ("ENGLISH") is selected.

Once on web page 420, the selection of items 422 or 428 route the transaction to AGENT GROUP X 450 for handling. If option 424 is selected, the user is prompted for his account number using web page 430. Once "SUBMIT" 434 is selected, the transaction is routed to AGENT GROUP Y 460 for handling. If option 426 is selected on web page 420, the user is prompted for his account number using web page 440. Once "SUBMIT" 444 is selected, the transaction is routed to AGENT GROUP Z 470.

In one embodiment, the information collected from menu 430 and 440 may be used to identify the customer to the agent. Alternatively, the information is used to access database 130 to provide the agent with customer-specific issues such as outstanding orders, sales, etc.

Figure 5:
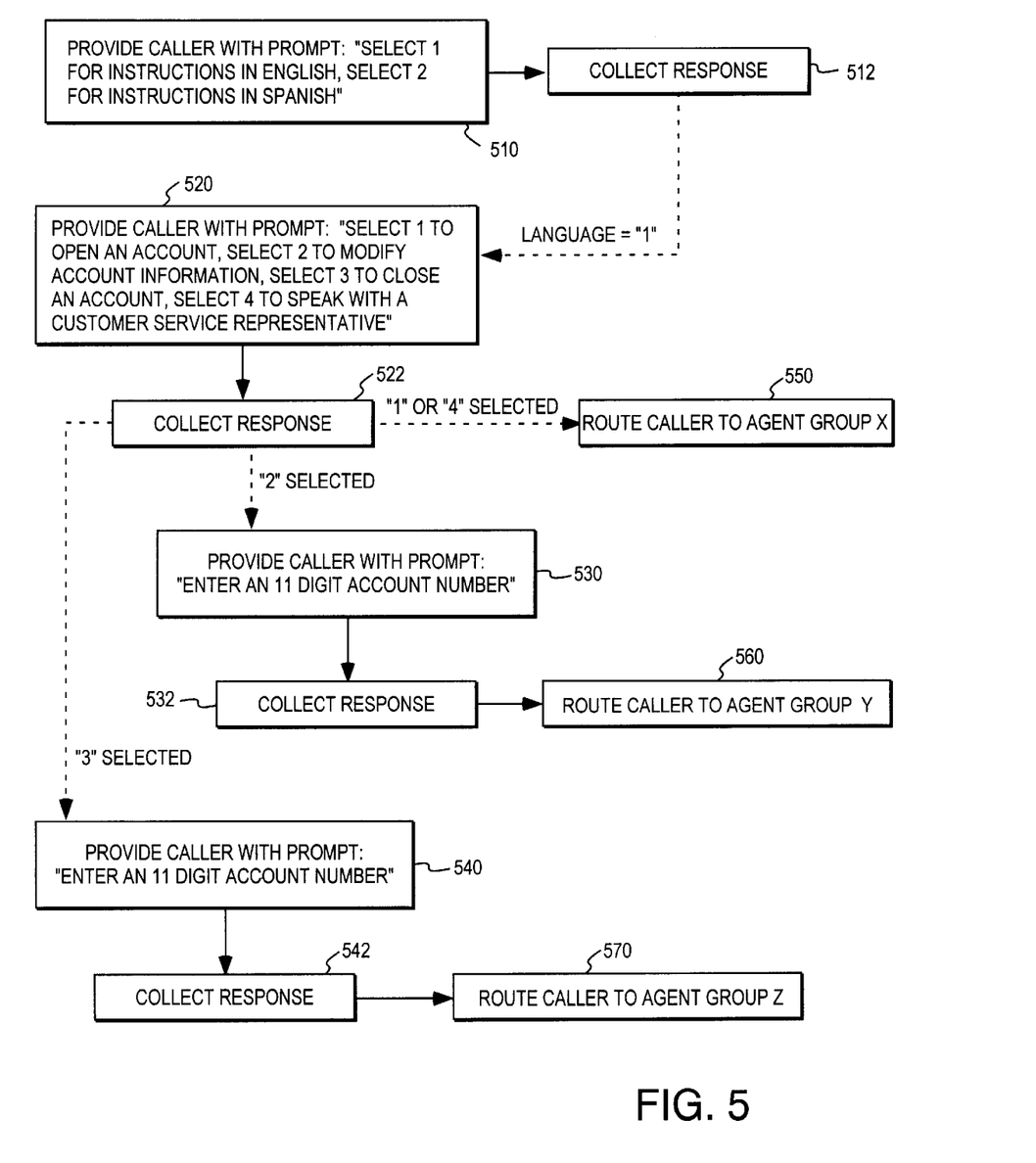
FIG. 5 illustrates the application of the method of FIG. 2 to the call control script of FIG. 3 for a telephonic application.

FIG. 5 illustrates the result of generating a call control script to handle telephone callers from the transaction routing control script of FIG. 3. In step 510, the caller is provided with a prompt. Step 512 collects the response to this prompt.

Processing continues with step 520 if the user selected English as the desired language. The user is then presented with prompt 520 and a number of choices. The response is collected again in step 522. Consistent with transaction routing control script 300, if the caller selects options "1" or "4" he is routed to agent group X in step 550. If the caller selects "2" or "3", he is presented with a corresponding prompt for an account number (530, 540). Once the account number is collected (532, 542), the caller is routed to agent group Y in step 560 or agent group Z 570 depending on the particular transaction the caller indicated in step 522.

Implementation of the collection steps 512, 522, 532, and 542 may vary between applications. For example, one application might accept only touch tone (i.e., dual tone multi-frequency (DTMF)) signals. Another application may only accept voice commands. The media-specific script generators can implement the collection step in a manner suitable for the corresponding communications medium. Accordingly, the collection steps 512, 522, 532, and 542 are media-specific collection steps. A single collection step could also handle multiple communications mediums. For example, an IVR system can use a single collection step to handle both voice and DTMF input. In one embodiment, the media-independent call control list may also include tags or tokens directing the collection step for a particular communications medium.

The prompt generated by the media-specific script generators may also vary somewhat between different communications mediums. Referring to FIGS. 3–5, the prompt appearing in web page 410 is constructed from prompt preamble 314 and options 322. The prompts for web pages 420–440 are similarly constructed from the prompt preambles and options of menus 330–350. The prompts of FIG. 5, however, are different because the medium is an audio rather than a visual medium. Accordingly, the prompts of FIG. 5 include the options defined in transaction routing control script 300, but the prompts use only portions of the corresponding prompt preamble when applicable. In one embodiment, the media-independent call control list contains tags or tokens to help indicate how the prompt should be constructed for a particular communications medium.

In one embodiment, the prompts and selections are substantially the same across the plurality of communications mediums, but the prompt presentation and response collection mechanisms are media-specific. Thus for example, a telephone-specific routing script may provide the caller with audio prompts and selections and then collect the response through touch tone detection or voice recognition. An internet or intranet communication routing script may provide the caller with a web page displaying the same prompts and selections. The user is then able to make a selection using the keyboard or a pointing device such as a mouse.

In order to have consistency across communication mediums, each communication medium should have a media-specific script incorporating the media-independent aspects of a generalized script as described above. The use of the source script consolidates the specification of the prompts and the call routing rules for multimedia calls into a centralized script to reduce the number of implementation errors otherwise introduced when attempting to independently maintain each media-specific call control script using media-specific applications.

Specific prompt, collection, and routing commands have been provided as exemplary transaction processing commands or scripting commands. Similarly, specific mediums such as facsimile, e-mail, and telephone calls have been provided as exemplary communication mediums. These specific mediums and commands are provided merely as examples. The methods and apparatus for providing consolidated specification and handling of multimedia call prompts may be applied to other communication mediums and other transaction processing or scripting commands as well.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method comprising:

receiving a transaction routing script at a script generator; and automatically generating a media-specific script for each of a plurality of communication mediums in accordance with the transaction routing script.

2. The method of claim 1 further comprising:

propagating at least one media-specific script to a transaction server handling the corresponding communication medium associated with that media-specific script.

3. The method of claim 2 wherein the transaction server is a component of an automated call distributor.

4. The method of claim 1 wherein one media-specific script corresponds to an electronic mail communications medium.

5. The method of claim 1 wherein one media-specific script corresponds to an interactive voice response communications medium.

6. The method of claim 1 wherein one media-specific script defines at least one web page.

7. The method of claim 6 wherein the one media-specific script defines a plurality of web pages hyperlinked in accordance with the call routing script.

8. The method of claim 6 wherein the web page is an intranet resource.

9. The method of claim 6 wherein the web page is an Internet resource.

10. The method of claim 1 wherein the transaction routing script defines a prompt including at least one selectable option and a routing destination for each selectable option.

11. An apparatus comprising:

a transaction processor to receive and route communications from a plurality of communications mediums, and a script generator coupled to the transaction processor, wherein the script generator is to automatically generate a plurality of media-specific routing scripts corresponding to selected communications mediums associated with the transaction processor in accordance with a media-independent portion of a pre-determined transaction routing script.

12. The apparatus of claim 11 wherein each communication medium is associated with a transaction server of the transaction processor, wherein the script generator is to propagate at least one media-specific script to the transaction server associated with the communication medium specific to that script.

13. The apparatus of claim 11 wherein one media-specific script corresponds to an electronic mail communications media.

14. The apparatus of claim 11 wherein one media-specific script corresponds to an interactive voice response communications medium.

15. The apparatus of claim 11 wherein one media-specific script defines at least one web page.

16. The apparatus of claim 15 wherein the one media-specific script defines a plurality of web pages hyperlinked in accordance with the predetermined transaction routing script.

17. The apparatus of claim 15 wherein the web page is an intranet resource.

18. The apparatus of claim 15 wherein the web page is an Internet resource.

19. The apparatus of claim 11 wherein the transaction processor is an automatic call distributor.

20. The apparatus of claim 11 wherein the media-independent portion of the pre-determined transaction routing script defines a prompt including at least one selectable option and a routing destination for each selectable option.

* * * * *

UNITED STATES PATENT AND TRADEMARK OFFICE
CERTIFICATE OF CORRECTION

PATENT NO.   : 6,850,614 B1
DATED         : February 1, 2005
INVENTOR(S)  : Collins It is certified that error appears in the above-identified patent and that said Letters Patent is hereby corrected as shown below:

Column 10,
Line 23, delete "predetermined" and insert -- pre-determined --, therefor.

Signed and Sealed this

Twenty-first Day of June, 2005

JON W. DUDAS
*Director of the United States Patent and Trademark Office*